United States Patent
Sweers (10) Patent No.: US 8,645,113 B2
(45) Date of Patent: Feb. 4, 2014

(54) METHODS AND SYSTEMS FOR EVALUATING A DESIGN OF AN AIRCRAFT

(75) Inventor: Gregory J. Sweers, Renton, WA (US)

(73) Assignee: The Boeing Company, Chicago, IL (US)

(*) Notice: Subject to any disclaimer, the term of this patent is extended or adjusted under 35 U.S.C. 154(b) by 1015 days.

(21) Appl. No.: 12/170,317

(22) Filed: Jul. 9, 2008

(65) Prior Publication Data

US 2010/0010794 A1 Jan. 14, 2010

(51) Int. Cl.
 *G06G 7/48* (2006.01)
(52) U.S. Cl.
 USPC .................................................. 703/8; 703/7
(58) Field of Classification Search
 CPC .................................................. G06F 17/5095
 USPC ....................... 703/2, 8, 6, 7, 13; 702/57, 182
 See application file for complete search history.

(56) References Cited

U.S. PATENT DOCUMENTS

| | | |
|---|---|---|
| 3,989,984 A | 11/1976 | Amason et al. |
| 4,352,142 A | 9/1982 | Olson |
| 5,225,265 A | 7/1993 | Prandy et al. |
| 6,725,183 B1 | 4/2004 | Cawse |
| 6,931,293 B1 | 8/2005 | Douglas et al. |
| 7,014,143 B2 | 3/2006 | Pham et al. |
| 7,277,769 B2 | 10/2007 | Yamazaki |
| 2008/0111024 A1 | 5/2008 | Lee et al. |
| 2008/0126033 A1* | 5/2008 | Meyer et al. ...................... 703/2 |

OTHER PUBLICATIONS

K.W. Chau, "Reliability and performance-based design by artificial Neural network", Advances in Engineering Software 38 (3) pp. 145149,2007.*
Advisory Circular, Instructions for continued airworthiness; maintenance tasks for high intensity radio frequency (HIRF) electromagenetic interference(EMI) lightning protection features. FAA, Nov. 17, 2003.*
Morris, M.; Incorporating Reliability Centered Maintenance Principles in Front End Engineering and Design of Deep Water Capital Projects; http://www.reliabilityweb.com/art07/rcm_design.htm; 11 sheets, Apr. 3, 2007.

* cited by examiner

*Primary Examiner* — Dwin M Craig
*Assistant Examiner* — Luke Osborne
(74) *Attorney, Agent, or Firm* — Armstrong Teasdale LLP (57) ABSTRACT

A method for evaluating a lightning/HIRF protection effectiveness of a vehicle design is provided. The method is performed using a computer system coupled to a database. The method includes storing in the database design service life goals and critical characteristics for at least one lightning/HIRF protection component. The method also includes storing in the database a potential for degradation of the at least one component. The potential for degradation is based at least partially on a position where the component is to be installed. The method also includes determining continued functionality of the at least one component using the computer system to compare the vehicle design to the stored design service life goals.

24 Claims, 3 Drawing Sheets

METHODS AND SYSTEMS FOR EVALUATING A DESIGN OF AN AIRCRAFT

BACKGROUND OF THE INVENTION

The field of the invention relates generally to methodologies used in aircraft design, and more specifically, to methods and systems for determining the durability of lightning protection components/systems incorporated within aircraft.

Aerospace vehicles depend heavily upon electronic systems and thus must be shielded against electromagnetic effects, such as electromagnetic interference (EMI), lightning, and high intensity radiated fields (HIRF). EMI interference may come in the form of lightning strikes, interference from radio emitters, nuclear electromagnetic pulses (EMP), and high power microwave (HPM) threats.

Aluminum hull aircraft are shielded from high-intensity radiated fields (HIRF) and/or lightning effects by virtue of their metallic construction. Manufacturing an aircraft from carbon fiber reinforced plastic (CFRP) provides benefits such as reduced weight and reduced manufacturing costs. However, CFRP does not provide the same shielding capabilities that are inherent in aluminum hull aircraft.

Typically, initial aircraft design practices do not account for long-term health of HIRF and lightning effects protection components. Such design practices may increase product support expenses, and potentially increase the risk that a rework and/or a redesign will be necessary. Furthermore, such design practices often lead to extensive scheduled maintenance in order to determine the continued effectiveness of the HIRF and lightning effects protection components.

Existing solutions rely on differing levels of design considerations for continued airworthiness across multiple design disciplines using individual intuition and interpretations of optimized design solutions. In cases where an inspection or a functional check is unavoidable, the existing solution does not consider a testing solution as part of an integrated continued airworthiness assessment within the detailed design phase of the aircraft development project.

It would be desirable to integrate continued airworthiness of lightning/HIRF protection components into the aircraft design process. Also, it would be desirable to facilitate a reduction in scheduled maintenance, product redesign, and product support, thus reducing the number of engineering labor hours necessary to monitor and maintain an aircraft. A design system that takes full advantage of engineering labor hours invested in the design of a product, as well as product development and certification testing, would be desired.

BRIEF DESCRIPTION OF THE INVENTION

In one aspect, a method for evaluating a lightning/high intensity radiated field (HIRF) protection effectiveness of a vehicle design is described. The method is performed using a computer system coupled to a database. The method includes storing in the database design service life goals and critical characteristics for at least one lightning/HIRF protection component of the vehicle design. The method also includes storing in the database a potential for degradation of the at least one component. The potential for degradation is based at least partially on a position where the component is to be installed. The method also includes determining continued functionality of the at least one lightning/HIRF protection component using the computer system to compare the vehicle design to the stored design service life goals.

In another aspect, a system for evaluating a lightning/high intensity radiated field (HIRF) protection effectiveness of a vehicle design is described. The system includes a computer coupled to a database. The computer is configured to store in the database design service life goals and critical characteristics for at least one lightning/HIRF protection component of the vehicle design. The computer is further configured to store in the database a potential for degradation of the at least one component. The potential for degradation is based at least partially on a position where the component is to be installed. The computer is further configured to determine continued functionality of the at least one lightning/HIRF protection component using the computer system to compare the vehicle design to the stored design service life goals.

In yet another aspect, a server system for evaluating a lightning/high intensity radiated field (HIRF) protection effectiveness of a vehicle design is described. The system includes a client system including a browser, a centralized database for storing information, and a server system configured to be coupled to the client system and the database. The server is further configured to store in the database design service life goals and critical characteristics for at least one lightning/HIRF protection component. The server is further configured to store in the database a potential for degradation of the at least one component, the potential for degradation based at least partially on a position where the component is to be installed. The server is further configured to determine continued functionality of the at least one lightning/HIRF protection component using the computer system to compare the vehicle design to the stored design service life goals.

In yet another aspect, a computer program embodied on a computer readable medium for evaluating a lightning/HIRF protection effectiveness of a vehicle design is described. The program includes at least one code segment that stores in the database design service life goals and critical characteristics for at least one lightning/HIRF protection component. The program also includes at least one code segment that stores in the database a potential for degradation of the at least one component, the potential for degradation based at least partially on a position where the component is to be installed. The program also includes at least one code segment that determines continued functionality of the at least one component using the computer system to compare the vehicle design to the stored design service life goals.

DETAILED DESCRIPTION OF THE INVENTION

Current aircraft design methodologies may include impromptu design reviews late in the design process and use engineering "tribunals" to determine the continued airworthiness of an aircraft design in a "post" detailed design setting. The decisions made by these reviews and tribunals may necessitate the rework of some designs, and delay completion of a finalized design. In addition, using the current process, the follow-on continued airworthiness maintenance program analysis performed by maintenance engineers is limited in its capability to revise non-optimized designs due to the late nature of the design stage in which this analysis is conducted. Such analysis may result in either mandatory design changes made late in the project or unwanted scheduled maintenance passed on to both an aircraft manufacturer and an aircraft operator that continues through the life of the aircraft. The current process may also result in scheduled maintenance tasks that require inspection for which tools and procedures do not presently exist.

Figure 1:
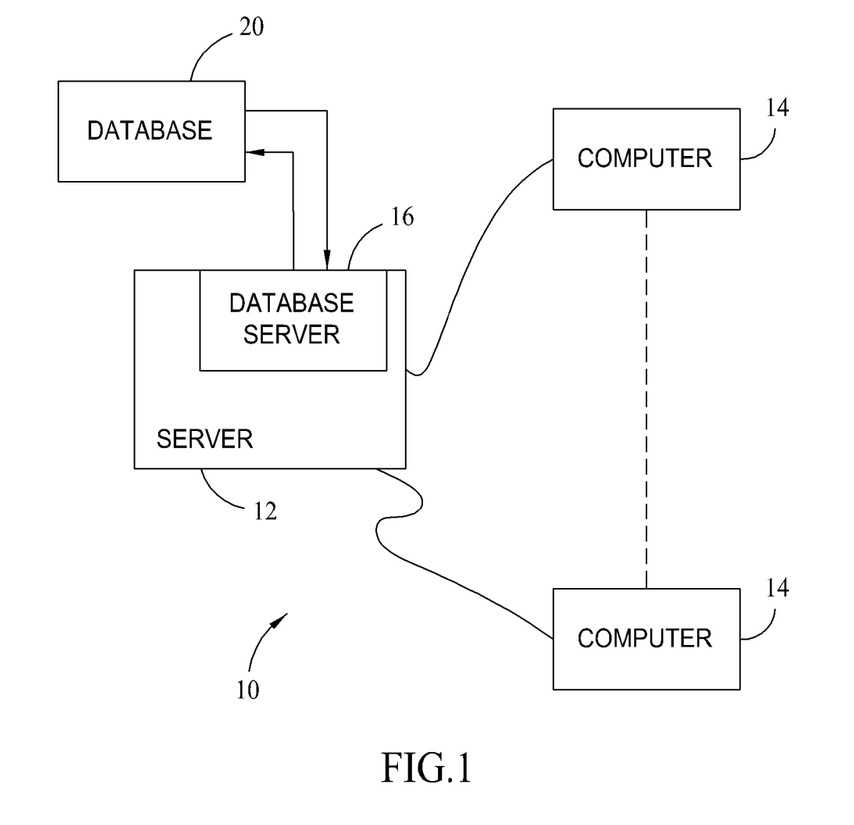
FIG. 1 is a simplified block diagram of an exemplary system in accordance with one embodiment of the present invention. The system is referred to as a Lightning/HIRF Protection Analysis System (LPAS).

FIG. 1 is a simplified block diagram of an exemplary system 10 including a server system 12, and a plurality of client sub-systems, also referred to as client systems 14, connected to server system 12. Computerized modeling and grouping tools, as described below in more detail, are stored in server 12, and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
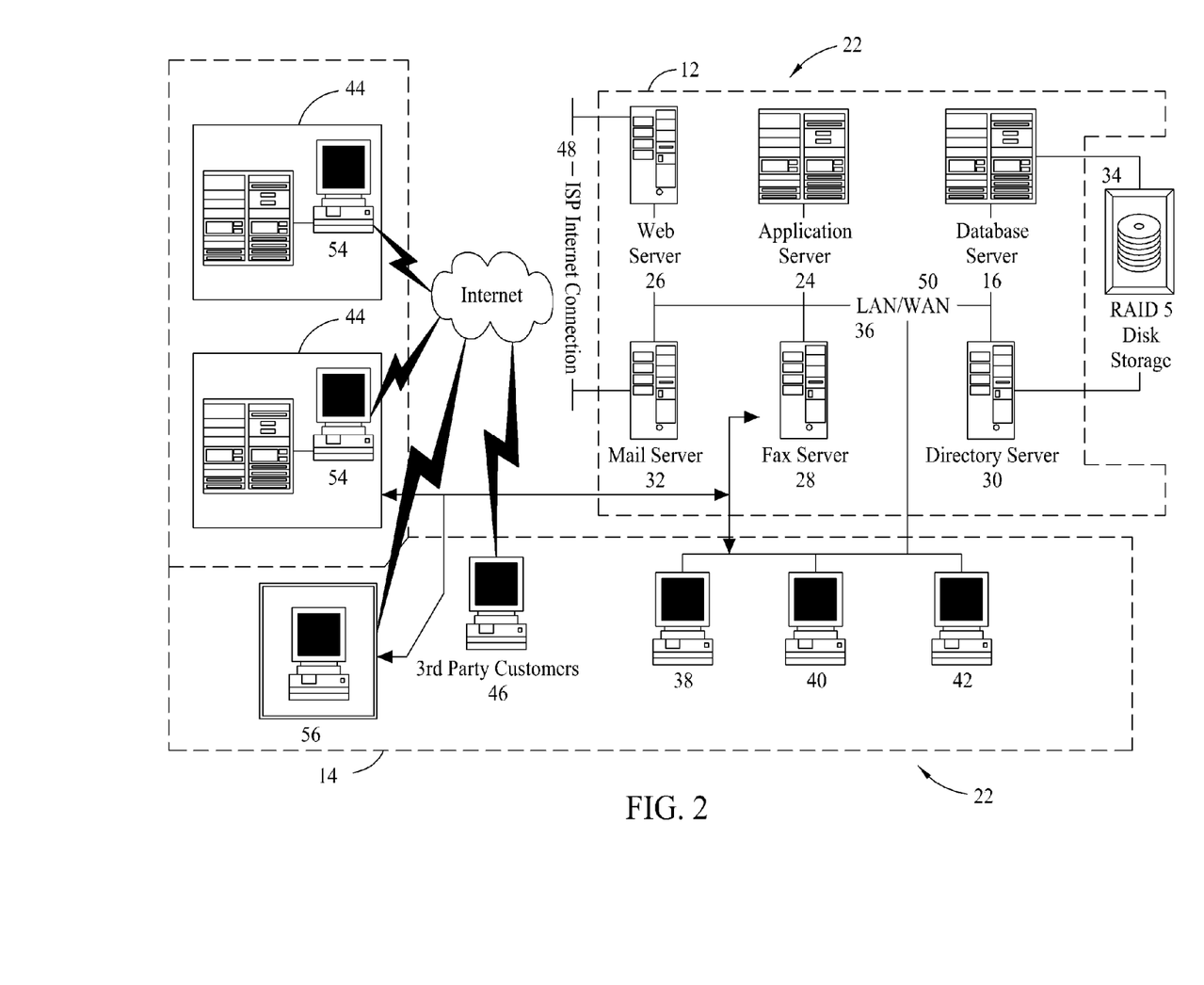
FIG. 2 is an expanded block diagram of an exemplary embodiment of a server architecture of a system in accordance with one embodiment of the present invention.

FIG. 2 is an expanded block diagram of an exemplary embodiment of a system 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., customers/contractors 46 using an internet service provider (ISP) Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
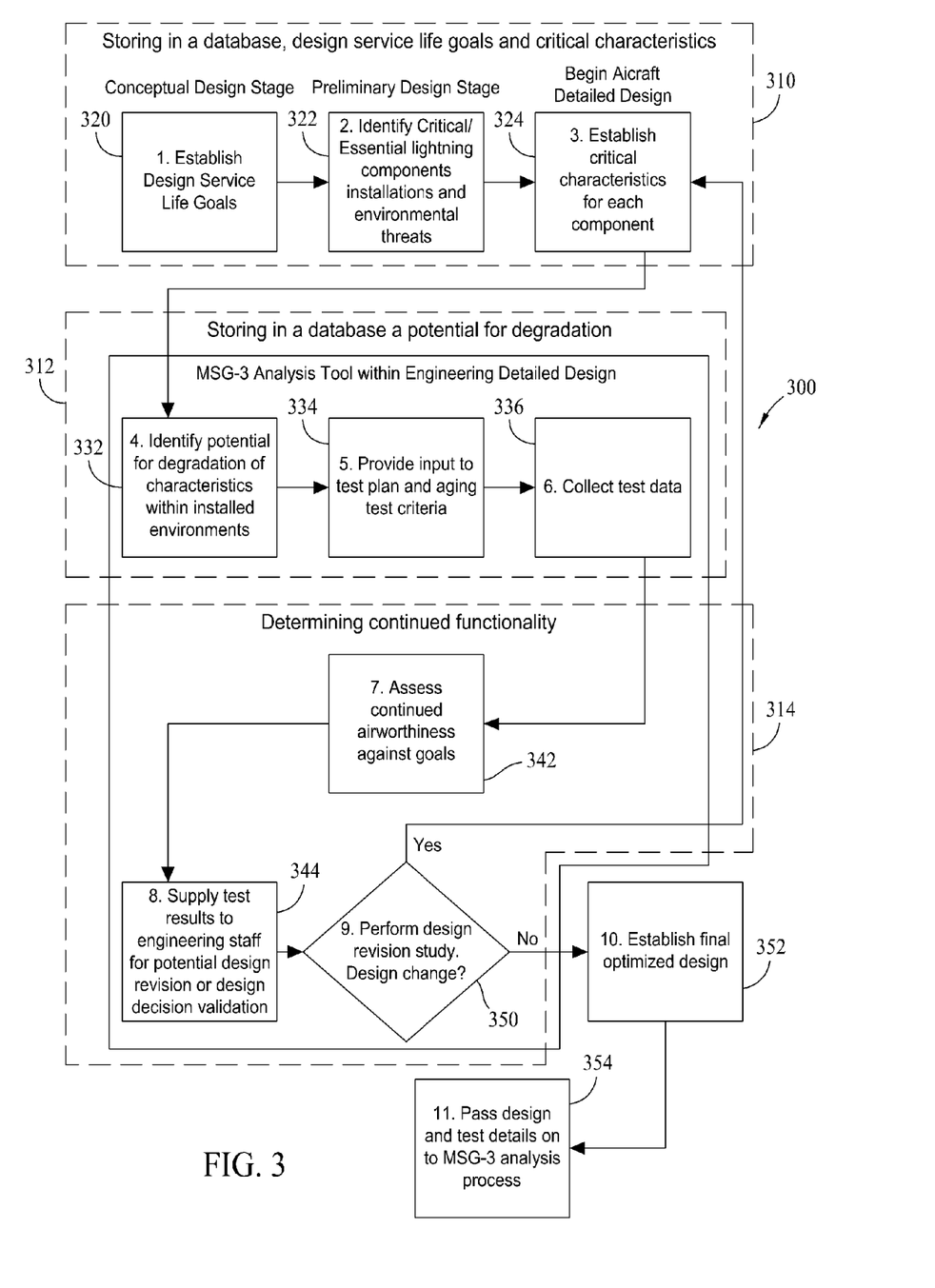
FIG. 3 is a flowchart illustrating exemplary processes utilized by the system shown in FIG. 1.

FIG. 3 is a flowchart 300 of an exemplary method of evaluating an aircraft design performed by systems 10 and/or 22 (e.g., Lightning/HIRF Protection Analysis Systems (LPAS)). More specifically, the method is a method for evaluating a lightning/high intensity radiated field (HIRF) protection effectiveness of the aircraft design. As described above, aircraft include components and/or systems that are designed to facilitate protection of sensitive electronics from the effects of a potential lightning strike and/or a HIRF condition. In other words, lightning/HIRF protection systems may be defined as components that avoid, eliminate, or reduce the consequences of a lightning/HIRF event. Lightning/HIRF protection components may be defined as any self-contained part, combination of parts, subassemblies, units, or structures that perform a distinctive function necessary to provide lightning/HIRF protection. Typically, such lightning/HIRF protection components/systems include backup or dual-layers of protection, especially when the electronics protected by the lightning/HIRF protection components/systems are vital, in case one of such protection components/systems degrades or fails. However, multiple layers of lightning/HIRF protection components/systems may be positioned in substantially similar environments and thus exposed to substantially similar degradation causing conditions.

In the exemplary embodiment, the method illustrated in flowchart 300 includes storing 310 in a database, design service life goals and critical characteristics for at least one lightning/HIRF protection component/system of the vehicle design, storing 312 in the database a potential for degradation of the at least one component, and determining 314 continued functionality of the at least one component using a computer system to compare the vehicle design to the stored design service life goals. In the exemplary embodiment, the design service life goals, critical characteristics for the at least one component, and potential for degradation of the at least one component are stored in database 20 (shown in FIG. 1).

More specifically, storing 310 includes first establishing 320 design service life goals for each of a plurality of lightning/HIRF protection components and/or a plurality of lightning/HIRF protection systems. The design service life goals for aircraft continued airworthiness are input to server system 12 and stored in database 20. Such design service life goals may include, but are not limited to, a number of years of desired service life, scheduled maintenance goals (i.e., time intervals between scheduled maintenance and down time caused by scheduled maintenance), and accessibility to the components/systems and maintainability of the components/systems.

In the exemplary embodiment, the design service life goals are established 320 by aircraft designers as part of the initial conceptual stages of the aircraft design process. For example, establishing 320 design service life goals includes establishing aircraft mission goals such as, but not limited to, twenty years of service, sixty-thousand flight hours, and forty-thousand flight cycles. During this phase of an aircraft design, program materials are selected, physical geometry is determined, and performance is continuously calculated to guide multiple engineering design inputs to a logical configuration. In the exemplary embodiment, lightning/HIRF protection design is included in the earliest stages of the design process to facilitate optimal lightning/HIRF protection design is within the boundaries of the established design goals.

In the example of a composite aircraft, significant design decisions are made regarding composite structure protection such as, but not limited to, imbedded foils and mesh applications. In the exemplary embodiment, areas where lightning most commonly strikes an aircraft are examined to facilitate optimization of protection designs at this stage of the aircraft design. As design decisions become finalized, to facilitate continuing lightning protection over the life of the aircraft, potential maintenance actions necessary to ensure continued functionality are determined early in the design process. If it is determined that maintenance actions are overly burdensome or not achievable, a change to the aircraft design is recommended early in the design process, which is described in more detail below. An early recommendation of a design change may facilitate the prevention of higher cost redesigns recommended later in the design process, added expenses due to detailed testing, and/or replacement of the lightning/HIRF protection components/systems.

In the exemplary embodiment, at least a portion of establishing 320 design service life goals includes awareness of accessibility to protection devices and components. Poor accessibility to a component that requires scheduled maintenance may lead to additional and more intense ground time and lost revenues. Establishing 320 and storing 310 design service goals in the maintainability studies typically included in early stages of an aircraft design facilitates prevention of additional costs and increased difficulty at later stages of aircraft design and manufacturing.

Storing 310 also includes first identifying 322 critical lightning/HIRF components/systems and environmental threats. In the exemplary embodiment, identifying 322 critical lightning/HIRF components/systems and environmental threats includes focusing engineering effort based on a criticality of a desired lightning/HIRF protection. The effect of damage caused by a lightning/HIRF condition varies depending upon the how critical the system damage is to the aircraft. Systems that may be damaged by a lightning/HIRF condition include, but are not limited to, safety systems, structural elements, ignition prevention protection, and general systems that may be upset due to a lightning/HIRF condition. Critical lightning/HIRF protection components/systems are those installations and devices whose failure can result in a potential catastrophic or hazardous condition.

During the preliminary design phase, aircraft lightning protection is designed to provide adequate conductive paths so that lightning currents do not create a hazardous or even a catastrophic condition. Conductive paths are provided by system control wiring, as well as structure and transport elements, such as hydraulic and fuel system tubes. For at least this reason, designers are careful to ensure that adequate current paths are provided given the model created by lightning zone determinations and calculated lightning currents. Suppression of dangerous surges may be accomplished through use of suppression devices or current paths provided by bonding and grounding techniques.

In the exemplary embodiment, identification 322 of required lightning/HIRF protection components/systems is made during the preliminary design phase of the aircraft development program after the lightning current threats are defined. As stated above, critical lightning/HIRF protection components/systems are those installations and devices whose failure can result in a potential catastrophic or hazardous condition. Once a protection scheme is established during the aircraft preliminary design and is determined to provide protection against the potential for a catastrophic or hazardous condition, documentation of the component is established, and in particular, the installed environment is identified. A matrix such as the example shown in Table 1 below may be used for this engineering analysis:

TABLE 1

Identification of Lightning/HIRF Significant Protective Components

| Component | Condition | Environment | Design Threat |
|---|---|---|---|
| Hydraulic transport element protector | Catastrophic | Moisture | Corrosion of installation fittings |
| Current path conducting joint in aircraft structure | Catastrophic | Temperature and Vibrations | Looseness of joint due to expansions and vibrations |
| Wing skin conducting path | Catastrophic | Low and high frequency vibrations from wing deflection and engines mounted on underside of wing | Loss of conducting path continuity to ground plane |

As the design of the aircraft matures, the list of significant lightning/HIRF protection components/systems stabilizes. The list may be managed by an electromagnetic continued airworthiness engineer and recognized by those engineering departments responsible for the protection design implementation. Formal identification of the protection components also facilitates a smooth transition of the significant components to a continued airworthiness analysis, for example, but not limited to, a maintenance steering group 3 (MSG-3) continued airworthiness analysis. MSG-3 is an analysis provided by the Air Transport Association (ATA) of America that includes defined engineering logic to determine the most appropriate scheduled maintenance task and interval for major components and structure of an aircraft.

Storing 310 design service life goals and critical characteristics for at least one component further includes establishing 324 critical characteristics for each lightning/HIRF component/system. As designs for the lightning/HIRF protection components/systems are finalized, consideration of the continued airworthiness of the installations is performed by establishing 324 critical characteristics and environmental threats that may be present as the aircraft enters its service life. Storing 310 includes first establishing 324 critical characteristics for each of the at least one component. Characteristics of a lightning/HIRF protection component are those properties of lightning/HIRF protection components that are necessary to perform their intended lightning/HIRF protection function(s).

In the exemplary embodiment, assessing the continued airworthiness of a particular design is achieved through the identification 324 of component characteristics (i.e., properties that are necessary to perform the intended function of the component). Properties of a component that may degrade over time may include, but are not limited to, conductivity of materials and galvanic junctions, degradation of bond path components (e.g., corrosion), installation design and locations, and wire looms and hardware.

Materials and galvanic junctions may include both conductive and non-conductive materials. Designs that require the interface of galvanically incompatible materials such as stainless steel fasteners through a carbon composite structure may require mitigation by a non-conductive material. Bond path components may be created by the addition of bond wires. It is important to ensure that the bond wire fasters and material are free from potential corrosion. Bond paths can also be secured through the use of fayed surface bonds produced through use of high torque fasteners. Though the fasters may not be in the bond path, it is still important to evaluate the continued airworthiness of the fayed surface in cases where the fasteners may break or loosen.

Multiple lightning/HIRF components/systems, for example, bond paths, isolation, and insulation, may function together to facilitate appropriate lightning transient mitigation. Details of the installations, such as brackets, structural mounting and isolating materials, require identification for assessment. For example, wire looms and hardware include connectors and associated shielding, which require specific material choices and secure installation. Disconnect brackets for continuance of wire bundles through aircraft structural production breaks are also important to include in the characteristics evaluation.

As described above, the method includes storing 310 in a database design service life goals and critical characteristics for at least one lightning/HIRF protection component/system of the vehicle design. In the exemplary embodiment, the method further includes storing 312 in the database a potential for degradation of the at least one component/system. The potential for degradation is based at least partially on a position where the component/system is to be installed on or within the aircraft. Storing 312 includes first identifying 332 a potential for degradation of characteristics within installed environments.

Once critical characteristics are established 324 for the lightning/HIRF protection components/systems, storing 312 includes identifying 332 a potential for degradation of component characteristics, taking into consideration the position on or within the aircraft that the components are to be installed. Degradation is commonly due to the environment in which the lightning/HIRF protection component/system is installed, and the method facilitates a reduction in degradation potential. Some of the leading degradation modes include, but are not limited to, corrosion of galvanic junctions, fatigue, mechanical malfunction or wear, heat damage, temperature cycle damage, and delamination or disbanding.

More specifically, in one example embodiment, a potential for degradation is stored 312 in database 20 for lightning/HIRF protection components/systems that may corrode when interfaced directly, for example, galvanic junctions. The potential degradation is dependent upon the installation location and corrosion mitigation design of the materials used in the components/systems. Also, loss of a conductive path can be a degradation mode for lightning/HIRF components if anticipated vibrations or other environmental conditions cause material fatigue that leads to loss of material continuity or interfacing. Another degradation mode includes mechanical malfunction or wear. In the exemplary embodiment, duty cycles of aircraft equipment and structure is identified where appropriate as potential degradations of conductive paths. An example of this might be the extension and retraction of control surfaces that contain specific bond path designs, such as bond wires or specific structural current path designs through structural components.

Yet another potential cause of degradation is exposure to high temperatures. Heat can cause negative effects on sealants and isolation devices, such as gaskets. In the exemplary embodiment, degradation modes contributed to heat are considered when developing the degradation mode identification.

Another potential cause of degradation of a lightning/HIRF protection component/system is exposure to extreme temperature cycles. Extreme temperature cycles may cause lightning/HIRF protection components/systems to expand and contract. With use of different materials in bonding and grounding designs, this expansion and contraction may cause interfaces to loosen or lose the required intimate contact.

Yet another potential cause of degradation includes delamination or disbanding. Some composite structures provide lightning protection by use of Expanded Aluminum Foils (EAF) or Bonded Aluminum Foils. Water ingress into a composite honeycomb structure can freeze and cause damage to the underlying structural integrity of the composite panel. This can also lead to degradation of the protection provided by the imbedded metals, as moisture may cause corrosion of the embedded metal.

Along with identifying 332 a potential for degradation of a component characteristic, storing 312 further includes providing 334 an input to a test plan and aging test criteria. With knowledge of the installed environment, the design features and the potential degradations modes, one can make valuable input into the testing plans for lightning/HIRF protection components/systems. In the exemplary embodiment, use of the following design influencing mechanisms facilitates gaining a more accurate continued airworthiness program within the Engineering Detailed Design phase of the project. The tests that may be influenced through use of this methodology include, but are not limited to, qualification test data gathered during component qualification testing, developmental test data captured during stress testing of new designs, and in-service testing.

As electromagnetic environments are defined by program engineers and qualification test requirements are established, consideration of the nature of the installed environment provides further insight to the continued airworthiness of components under test. Though the challenge with qualification testing is that true degradation profiles can not be reproduced in the laboratory environment, developmental testing of components provides at least some indication of a components ability to continue functioning under extreme environments.

In the exemplary embodiment, inputs to the test plans include, but are not limited to, design service life objective comparisons to test profile simulations, a location where the component is to be installed, whether testing to failure is required, a comparison of an aircraft worst case environment to a test standard, galvanic junction assessments, test setup criteria, and effects of fatigue on electrical properties.

Design service life objective comparisons to test profile simulations provide a determination of how close the length that different tests are conducted is to the actual design life of the component/system. For example, how close in flight cycles, flight hours, or in years the tests are to an aircrafts real-life exposure. With installed location information one can estimate the severity of the environmental exposure anticipated during aircraft operations, including, but not limited to, a component positioned inside a pressure vessel, a component positioned outside a pressure vessel but protected, and a component positioned outside a pressure vessel and exposed.

Another input to the test plan is whether a test to failure is required. A test to failure may not be necessary when a user is able to predict degradation and conclude end of life values. For unpredictable degradation, testing to failure may be the only choice as the gain from testing to failure will not be applicable in normal operations. More specifically, in the exemplary embodiment, aging test profiles are assessed and applied based on the application, and a maximum failed condition value and margin are assessed.

Inputs to the test plan further include, a comparison of an aircraft worst case environment to the test standard. This information allows a system, for example, system 22 (shown in FIG. 2), to conclude the potential operating margin between the worst case operating environments and the testing conditions established for laboratory simulations. Though these may not be directly comparable, it may be wise to re-examine the design if the operational margins are within a predetermined percentage of the simulated environment margins, including, but not limited to a temperature of the environment, a moisture content in the environment, chemical threats to the environment, and vibration within the environment.

Inputs to the test plan also may include assessments of galvanic junctions. Galvanic junction information on intentional and non-intentional galvanic junctions, for example, junctions used to ground aircraft components to the aircraft structure, allows a determination of profiles of resistance creep throughout the test. Large resistance changes due to aging of parts may be a threat to lightning/HIRF protection. Mitigation against corrosion of galvanic junctions, such as sealants, may also be included in the testing. Such information provides the continued airworthiness engineer with a better idea of the design robustness when subjected to the different tests.

Inputs to the test plan may further include test setup criteria. Comparing the aircraft system installations to a laboratory setup may be impractical to simulate the exact configuration of the aircraft installation. The location of the installation, the geometry, and the combined environmental threats, may together, or individually, establish a unique challenge for test engineers. Making the mistake of accepting laboratory results without consideration for the test set-up simulation may result in erroneous continued airworthiness conclusions.

Inputs to the test plan also may include defects that may be caused by fatigue of electrical properties. Flight cycles and vibrations can have an effect on the longevity of the electrical connection. For example, bond straps on control surfaces may fatigue to failure in service, broken or loose connector back shells may interrupt adequate bond paths, and hydraulic line clamps may fatigue that are conductive and assist with transferring large lightning currents during a lightning strike event. The effect on electrical connections from stress and fatigue are not typically part of a vehicle design test plan. In the exemplary embodiment, inputs from the continued airworthiness engineer ensure that the fatigue tests include follow-up measurements of the conductive joints.

Along with identifying 332 a potential for denigration of component characteristics and providing 334 an input to the test plan, storing 312 further includes collecting 336 test data. In the exemplary embodiment, a survey is devised to collect the data that reflects the interests of the inputs provided 334.

In the exemplary embodiment, the continued airworthiness engineer establishes the vehicle in which the data will be collected. Furthermore, a continued airworthiness document is used by an aircraft original equipment manufacturer (OEM) to centralize this information and refer specific information into the MSG-3 process.

In addition to storing 310 in a database design service life goals and critical characteristics, and storing 312 in the database a potential for degradation of the at least one component/system, the method illustrated in flowchart 300 also includes determining 314 continued functionality of the at least one component using the computer system, for example computer system 22 (shown in FIG. 2), to compare the vehicle design to the stored design service life goals. In the example of an aircraft, functionality of a component may also be described as airworthiness of the component. Determining 314 includes first assessing 342 continued airworthiness against design service life goals. In the exemplary embodiment, with the results from the lab testing and feedback provided to the test engineer, the continued airworthiness engineer leads a series of collaborative sessions between the test engineer and design engineer. The structure of this assessment is provided by the continued airworthiness engineer working within the engineering project. Some of the key elements that may be considered during these discussions are identification of key measures of continued airworthiness, performance of the components under degraded conditions, and recommendations for revisions.

In the exemplary embodiment, key measures of continued airworthiness are considered. Typically, at this level of examination, the inclusion of maintenance errors is not part of the continued airworthiness evaluation. For the continued airworthiness evaluation of this type, it is assumed that the aircraft is restored to its certified configuration at every maintenance inspection. This ensures that maintenance is not applied on an aircraft simply to address lack of training or proper instructions for continued airworthiness.

More specifically, key measures of continued airworthiness may include, a corrosion level identification and associated rating of the severity of the corrosion, electrical conductivity decay over time, security of installations, potential for accidental damage to affect the ongoing performance of the lightning/HIRF protection, and detection of degradation.

In the exemplary embodiment, another key element of continued airworthiness that may be considered against design service life goals is the performance of the components under degraded conditions. In the exemplary embodiment, the performance of the components under degraded conditions may be given an adequate/not-adequate label. Also, along with this decision, a technical reason for the concern may be provided.

Assessing 342 continued airworthiness against goals further includes providing recommendations for revisions. Recommendations for revisions are made based on evaluation of the expected performance and test results, as well as based on in-service experience. Some key measures of improvement may include, but are not limited to, hardware improvements, material changes, and installation restrictions.

Evaluation of the expected performance also includes a measure of whether the design will meet its intended continued airworthiness goals. One approach to accomplishing this is to establish whether the component will be able to perform its duty within the defined maintenance program level goals set by the project. For example, a determination that the component will require scheduled maintenance every onehundred flight hours is not compatible with a goal that scheduled maintenance begin no sooner that three-thousand flight hours.

Determining 314 continued airworthiness further includes supplying 344 test results to engineering staff for potential design revision or design validation. Once the test results have been assessed 342 for continued airworthiness, the engineer concerned with the continued airworthiness of the design will supply conclusions regarding parameters of interest. It is known to some test engineers that components pass qualification tests in the laboratory, yet fail to perform in service for the life of the aircraft. In the exemplary embodiment, it is beneficial at this point in the vehicle design to take any developmental testing results into account. This type of testing usually explores breaking points in the design and abuse characteristics beyond that which is required for qualification testing. In the exemplary embodiment, continued airworthiness engineers provide assessments of the expected performance of components based on experience with similar designs or based on in-service testing that is done by airline operators or OEM test teams on similar components.

Another source of data may be exploratory testing of aircraft that are no longer in service. This testing may include destructive testing. In the exemplary embodiment, databases are created for lightning/HIRF protection components/systems performance data. In cases where the test shows a lack of robustness in the design, for example, an inability of a component to function as designed in the environment selected, a request for an engineering trade study is made. Part of this request is an agreement that the design engineer, the test engineer, and the continued airworthiness engineer evaluate the design configurations identified in the survey for redesign or improvement. Such a request facilitates the advantage of evaluating the component performance beyond the qualification test results before the design is fixed. In the exemplary embodiment, critical design reviews are underway in the design project. Evaluation of the design should follow in the same manner as the rest of the design reviews already under way.

Determining 314 continued airworthiness still further includes performing 350 a design revision study. The goal of the design option "study" within the method is to determine if a particular lightning/HIRF protection design should be revised. Evaluation of the design alternatives is not a new process in most aircraft manufacturers operations. Evaluations of design optimization have recently included more sophisticated ways to model maintenance cost impacts. Though aircraft system performance (e.g., mean time between failure), operating costs (e.g., fuel, crew, landing and navigation fees), and ownership costs are known factors in designing an aircraft, maintenance costs are much more challenging to quantify. This is because duty cycles, maintenance skills, salaries and union structures, overhaul and general philosophy within airline operations create wide variances in cost, even when comparing the same aircraft design.

More sophisticated manufacturer's maintenance cost models enable the performance of cost studies that include the impact of continued airworthiness into the final trade equation. With an eye towards the impact of added maintenance for designs that do not age gracefully, the equation for determining preferred design alternatives focuses on the cost of a revised design in comparison to the life cycle cost of the increased maintenance. Given a total picture of the total aircraft operating cost, any recommended change in the design can be proven to gain value for the future operator and the aircraft manufacturer, provided the price of the aircraft takes into account the expenses associated with the alternative designs. Some of the factors to consider in the trade study of alternative designs are, availability, price, and complexity.

For designs that are changed as a result of the trade study, the process of redefining critical characteristics and test criteria is repeated starting with establishing 324 critical characteristics for each component.

In the exemplary embodiment, the method also includes establishing 352 a final optimized design. As the design alternatives are reduced to an optimum implementation, final design decisions for lightning/HIRF protection components are established. Final configuration is established and full scale production of the first article begins. At this point, final conclusions regarding the expected in-service performance and assumptions used in making the design decisions are recorded. In the exemplary embodiment, final design characteristics, test performance, and expected performance while deployed in service are included as additional details in the continued airworthiness document described above with respect to collecting 336 test data. This document is an important communication tool between design and continued airworthiness engineers. Some of the key expected activities associated with establishing 352 a final optimized design include: a. stabilizing the configuration, b. summarizing key required design features, c. revising characteristics for final release, and d. documenting expected service performance.

In the exemplary embodiment, the method illustrated in flowchart 300 still further includes providing 354 design and test details to an MSG-3 analysis process. The method creates a link between design and continued airworthiness evaluation. The advantages of including testing and known in-service performance details may also be leveraged to the MSG-3 process. Using the method illustrated in flowchart 300, components that make up the aircraft lightning/HIRF protection will have gone through an analysis that is complimentary to the MSG-3 type analysis during the design phase. The method facilitates an enhanced design process since conclusions within the early design review are aligned with the MSG-3 analysis. Key elements within the newly revised lightning/HIRF MSG-3 methodology (reference ATA MSG-3, Guidelines 2007) include identification of lightning/HIRF protection components, component characteristics, degradation modes expected within the installed environment, and maintenance decision logic for designs that are not considered robust enough to maintain the certification level for the life of the aircraft within its installed environment.

Providing 354 design and test details to the MSG-3 analysis process may also include determining applicable and effective maintenance. For components that are susceptible to degradation, where a design change was not the optimal solution, the MSG-3 analysis determines applicable and effective maintenance. In cases where the method illustrated in flowchart 300 and the MSG-3 analysis conclude excellent continued airworthiness performance, with no appreciable degradation, no maintenance is selected.

The systems and methods described above facilitate an efficient and cost effective design process through the early identification of design susceptibility to degradation, more specifically, identification of design susceptibility before a final design is established. In the exemplary embodiment, the method compliments the MSG-3 analysis through use of the LPAS within the design cycle.

The systems and methods described above facilitate a reduction in engineering labor hours associated with redesign from the engineering design process and data delivery to the maintenance program development process. This reduction in labor hours is accomplished by incorporating a continued airworthiness evaluation tool (e.g., LPAS) within the engineering detailed design process. In addition, the systems and methods described above incorporate test data into the design decision making tool that leverage reuse of investment dollars associated with the testing for the purpose of optimizing designs to include the expected performance of the design over the service life of the product. Use of this tool will enable design revision studies for lightning/HIRF protection components at an early stage in the development program that minimizes the impact of design revisions deemed necessary by the tool.

The systems and methods described herein integrate continued airworthiness determinations of lightning/HIRF protection components into the aircraft design process in a cost effective and efficient manner. The systems and methods described herein also facilitate a reduction in scheduled maintenance, product redesign, and product support, thus reducing the number of engineering labor hours necessary to monitor and maintain an aircraft. The systems and methods described herein also facilitate use of a reduced number of engineering labor hours invested in the design of the aircraft and facilitate the efficient use of those labor hours.

The systems and methods described herein are described in the context of an aircraft. Such systems and methods, however, are not limited to practice in connection with just aircraft and can be used in connection with any aircraft or vehicle. As used herein, the term aircraft refers to airplanes, helicopters, missiles, and any object capable of flight. Furthermore, the term vehicle refers to any object capable of mobility, including automobiles, ships, tanks, trucks, and locomotives.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for evaluating a lightning/high intensity radiated field (HIRF) protection effectiveness of a preliminary vehicle design, said method performed using a computer system coupled to a database, said method comprising:

storing in the database design service life goals for at least one lightning/HIRF protection component included in the preliminary vehicle design, the design service life goals including a pre-determined service life of a vehicle associated with the preliminary vehicle design, maintenance goals for the at least one component, and maintainability of the at least one component;

storing in the database a potential for degradation of the at least one component, wherein the potential for degradation is determined based on at least one of conductive paths and material interfaces that will result from a position where the component is to be installed;

storing, in the database, test data for the at least one component, wherein the test data includes results from performance testing and an expected in-service performance of the at least one component based on the stored potential for degradation of the at least one component in the position where the component is to be installed;

determining continued functionality of the at least one component included in the preliminary vehicle design using the computer system to compare the test data to the stored design service life goals over the pre-determined service life of the vehicle; and providing a design change recommendation for a final vehicle design when the continued functionality does not meet the stored design service life goals.

2. A method in accordance with claim 1, wherein storing in the database a potential for degradation comprises identifying critical lightning/high intensity radiated field (HIRF) components.

3. A method in accordance with claim 1, wherein storing in the database a potential for degradation comprises storing degradation data of:
component materials and galvanic junctions;
bond path components;
installation design and positions within the vehicle; and
wire looms and hardware.

4. A method in accordance with claim 1, wherein storing in the database a potential for degradation further comprises, basing the potential for degradation on how the position where the component is to be installed affects:
component corrosion;
component fatigue;
mechanical malfunction and/or wear of the component;
heat damage to the component;
exposure of the component to temperature cycles; and
delamination and/or disbonding of the component.

5. A method in accordance with claim 1, wherein determining continued functionality further comprises determining a design threat for the at least one component based on a stored consequence level and the position where the component is to be installed.

6. A method in accordance with claim 5, wherein determining the design threat based on a stored consequence level further comprises, determining the consequence level based on potential damage to the vehicle that may occur if the lightning/HIRF component fails and a lightning strike/HIRF condition occurs.

7. A system for evaluating a lightning/high intensity radiated field (HIRF) protection effectiveness of a preliminary vehicle design, said system comprising a computer coupled to a database, said computer configured to:

store in the database design service life goals for at least one lightning/HIRF protection component included in the preliminary vehicle design, the design service life goals including a pre-determined service life of a vehicle associated with the preliminary vehicle design, maintenance goals for the at least one component, and maintainability of the at least one component;

store in the database a potential for degradation of the at least one component, wherein the potential for degradation is determined based on at least one of conductive paths and material interfaces that will result from a position where the component is to be installed;

store, in the database, test data for the at least one component, wherein the test data includes results from performance testing and an expected in-service performance of the at least one component based on the stored potential for degradation of the at least one component in the position where the component is to be installed;

determine continued functionality of the at least one component included in the preliminary vehicle design using the computer to compare the test data to the stored design service life goals over the pre-determined service life of the vehicle; and provide a design change recommendation for a final vehicle design when the continued functionality does not meet the stored design service life goals.

8. A system in accordance with claim 7, wherein said computer is further configured to identify critical lightning/HIRF components.

9. A system in accordance with claim 7, wherein said computer is further configured to store degradation data of at least one of:
- component materials and galvanic junctions;
- bond path components;
- installation design and positions within the vehicle; and
- wire looms and hardware.

10. A system in accordance with claim 7, wherein said computer is further configured to base the potential for degradation on how the position where the component is to be installed affects at least one of:
- component corrosion;
- component fatigue;
- mechanical malfunction and/or wear of the component;
- heat damage to the component;
- exposure of the component to temperature cycles; and
- delamination and/or disbonding of the component.

11. A system in accordance with claim 7, wherein said computer is further configured to determine a design threat for the at least one component based on a stored consequence level and the position where the component is to be installed.

12. A system in accordance with claim 11, wherein said computer is further configured to determine the consequence level based on potential damage to the vehicle that may occur if the lightning/HIRF component fails and a lightning strike/HIRF condition occurs.

13. A system for evaluating a lightning/high intensity radiated field (HIRF) protection effectiveness of a preliminary vehicle design, said system comprising:
- a client system comprising a browser;
- a centralized database for storing information; and
- a server system configured to be coupled to said client system and said database, said server system further configured to:
  - store in the database design service life goals for at least one lightning/HIRF protection component included in the preliminary vehicle design, the design service life goals including a pre-determined service life of a vehicle associated with the preliminary vehicle design, maintenance goals for the at least one component, and maintainability of the at least one component;
  - store in the database a potential for degradation of the at least one component, wherein the potential for degradation is determined based on at least one of conductive paths and material interfaces that will result from a position where the component is to be installed;
  - store, in the database, test data for the at least one component, wherein the test data includes results from performance testing and an expected in-service performance of the at least one component based on the stored potential for degradation of the at least one component in the position where the component is to be installed;
  - determine continued functionality of the at least one component included in the preliminary vehicle design by comparing the test data to the stored design service life goals over the pre-determined service life of the vehicle; and
  - provide a design change recommendation for a final vehicle design when the continued functionality does not meet the stored design service life goals.

14. A system in accordance with claim 13, wherein said server is further configured to identify critical lightning/HIRF components.

15. A system in accordance with claim 13, wherein said server is further configured to store degradation data of at least one of:
- component materials and galvanic junctions;
- bond path components;
- installation design and positions within the vehicle; and
- wire looms and hardware.

16. A system in accordance with claim 13, wherein said server is further configured to base the potential for degradation on how the position where the component is to be installed affects at least one of:
- component corrosion;
- component fatigue;
- mechanical malfunction and/or wear of the component;
- heat damage to the component;
- exposure of the component to temperature cycles; and
- delamination and/or disbonding of the component.

17. A system in accordance with claim 13, wherein said server is further configured to determine a design threat for the at least one component based on a stored consequence level and the position where the component is to be installed.

18. A system in accordance with claim 17, wherein said server is further configured to determine the consequence level based on potential damage to the vehicle that may occur if the lightning/HIRF component fails and a lightning strike/HIRF condition occurs.

19. A computer program embodied on a non-transitory computer readable medium for evaluating a lightning/high intensity radiated field (HIRF) protection effectiveness of a preliminary vehicle design, said program comprising at least one code segment that:
- stores in a database design service life goals for at least one lightning/HIRF protection component included in the preliminary vehicle design, the design service life goals including a pre-determined service life of a vehicle associated with the preliminary vehicle design, maintenance goals for the at least one component, and maintainability of the at least one component;
- stores in the database a potential for degradation of the at least one component, wherein the potential for degradation is determined based on at least one of conductive paths and material interfaces that will result from a position where the component is to be installed;
- stores, in the database, test data for the at least one component, wherein the test data includes results from performance testing and an expected in-service performance of the at least one component based on the stored potential for degradation of the at least one component in the position where the component is to be installed;
- determines continued functionality of the at least one component included in the preliminary vehicle design by comparing the test data to the stored design service life goals over the pre-determined service life of the vehicle; and
- provides a design change recommendation for a final vehicle design when the continued functionality does not meet the stored design service life goals.

20. A computer program in accordance with claim 19 further comprising at least one code segment that identifies critical lightning/HIRF components.

21. A computer program in accordance with claim 19 further comprising at least one code segment configured to store degradation data of at least one of:
- component materials and galvanic junctions;
- bond path components;
- installation design and positions within the vehicle; and
- wire looms and hardware.

22. A computer program in accordance with claim 19 further comprising at least one code segment configured to base the potential for degradation on how the position where the component is to be installed affects at least one of:
- component corrosion;
- component fatigue;
- mechanical malfunction and/or wear of the component;
- heat damage to the component;
- exposure of the component to temperature cycles; and
- delamination and/or disbonding of the component.

23. A computer program in accordance with claim 19 further comprising at least one code segment configured to determine a design threat for the at least one component based on a stored consequence level and the position where the component is to be installed.

24. A computer program in accordance with claim 23 further comprising at least one code segment configured to determine the consequence level based on potential damage to the vehicle that may occur if the lightning/HIRF component fails and a lightning strike/HIRF condition occurs.

* * * * *